United States Patent
Abileah et al.

(10) Patent No.: US 6,910,216 B2
(45) Date of Patent: *Jun. 21, 2005

(54) IMS TRANSACTION MESSAGES METAMODEL

(75) Inventors: Shahaf Abileah, Portland, OR (US); Shyh-Mei F. Ho, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 737 days.

This patent is subject to a terminal disclaimer.

(21) Appl. No.: 09/849,816

(22) Filed: May 4, 2001

(65) Prior Publication Data

US 2002/0038336 A1 Mar. 28, 2002

Related U.S. Application Data

(60) Provisional application No. 60/223,671, filed on Aug. 8, 2000.

(51) Int. Cl.[7] .............................. G06F 3/00; G06F 9/44; G06F 9/46; G06F 13/00
(52) U.S. Cl. ........................................ 719/319; 719/313
(58) Field of Search .......................... 719/310, 313–318, 719/319, 320, 329; 709/203–205

(56) References Cited

U.S. PATENT DOCUMENTS

| | | | | |
|---|---|---|---|---|
| 6,094,688 A | * | 7/2000 | Mellen-Garnett et al. ... | 719/328 |
| 6,738,975 B1 | * | 5/2004 | Yee et al. .................... | 719/310 |
| 2003/0191970 A1 | * | 10/2003 | Devine et al. .............. | 713/201 |

OTHER PUBLICATIONS

James Martin, "Principles of Object–Oriented Analysis and Design", Oct. 29, 1992, Chapter 1–22.
"Quaterdeck Mosaic User Guide", 1995, Chapters 1–7.

* cited by examiner

Primary Examiner—Thomas Lee
Assistant Examiner—Diem K. Cao
(74) Attorney, Agent, or Firm—Sughrue Mion, PLLC

(57) ABSTRACT

A method of and a system for processing an enterpise an application request on an end user application and an application server. This is accomplished by initiating the application request on the end user application in a first language (such as a markup language) with a first application program (such as a Web browser), and transmitting the application request to the server and converting the application from the first language of the first end user application to a language running on the application server, processing the application request on the application server, and transmitting the response from the application server back to the end user application, and converting the response from the language running on the application server to the language of the end user application. The end user application and the application server have at least one connector between them, and the steps of (i) converting the application request from the language of the end user application (as a source language) to the language running on the application server (as a target language), and (ii) converting the response to the application request from the language running on the application server (as a source language) to the language of the end user application (as a target language), each include the steps of invoking connector metamodels of the respective source and target languages, populating the connector metamodels with metamodel data of each of the respective source and target languages, and converting the source language to the target language.

15 Claims, 8 Drawing Sheets

FIG. 11

<<enumeration>> TCommandType
- ClientBid : String
- ServerAvailable : String
- CBresynch : String
- SuspendProcessingForAllTpipes : String
- ResumeProcessingForAllTpipes : String
- SuspendInputForTpipe : String
- ResumeInputForTpipe : String
- SRVresynch : String
- REQresynch : String
- REPresynch : String
- TBresynch : String

<<enumeration>> TPrefixFlag
- StateData : String
- SecurityData : String
- UserData : String
- ApplicationData : String

<<enumeration>> TCommitConfirmationFlag
- Comitted : String
- Aborted : String

<<enumeration>> TChainFlag
- FirstInChain : String
- MiddleInChain : String
- LastInChain : String
- DiscardChain : String

<<enumeration>> TMessageType
- Data : String
- Transaction : String
- Response : String
- Command : String
- CommitConfirmation : String

<<enumeration>> TProcessingFlag
- SynchronizedTpipe : String
- AsynchronousOutput : String
- ErrorMessageFollows : String

IMS TRANSACTION MESSAGES METAMODEL

CROSS-REFERENCE TO RELATED APPLICATION

This application claims the benefit under Title 35, United States Code, Sections 111(b) and 119(e), relating to Provisional Patent Applications, of the filing date of U.S. Provisional Patent Application Ser. No. 60/223,671 filed Aug. 8, 2000 of Steven A. Brodsky and Shyh-Mei Ho for EA1 Common Application Metamodel.

This application is also related to the following United States Patent Applications, filed on even date herewith:

COMMON APPLICATION METAMODEL by Shyh-Mei Ho, Stephen Brodsky, and James Rhyne; a pending application filed on May 4, 2001 and assigned application Ser. No. 09/849,107.

COBOL METAMODEL by Shyh-Mei Ho, Nick Tindall, James Rhyne, Tony Tsai, Peter Elderon, and Shahaf Abileah; a pending application filed on May 4, 2001 and assigned application Ser. No. 09/849,813.

PL/I METAMODEL by Shyh-Mei Ho, Peter Elderon, Eugene Dong and Tony Tsai; a pending application filed on May 4, 2001 and assigned application Ser. No. 09/849,563.

HIGH LEVEL ASSEMBLER METAMODEL by Shyh-Mei Ho, John Ehrman, Benjamin Sheats, and Jenny Hung; an application filed on May 4, 2001 and assigned application Ser. No. 09/849,190, and having issued on Aug. 10, 2004 as U.S. Pat. No. 6,775,680.

TYPE DESCRIPTOR METAMODEL by Shyh-Mei Ho, James Rhyne, Peter Erderon, Nick Tindall, and Tony Tsai; a pending application filed on May 4, 2001 and assigned application Ser. No. 09/849,377.

IMS TRANSACTION MESSAGES METAMODEL by Shyh-Mei Ho and Shahaf Abileah; a pending application filed on May 4, 2001 and assigned application Ser. No. 09/849,816.

CICS-BMS (BASIC MESSAGE SERVICE) METAMODEL by Shyh-Mei Ho, Andy Krasun, and Benjamin Sheats; a pending application filed on May 4, 2001 and assigned application Ser. No. 09/849,793.

FIELD OF THE INVENTION

The invention relates to exchanging instructions and/or data between applications to signal readiness to transfer, exchange, or process data, or to establish at least one or more parameters for transferring data between the applications, and controlling the parameters in order to facilitate data transfer and communication. The invention further relates to integrating dissimilar applications one executing within one platform and another executing in another platform, e.g., multiple computers, multiple operating systems, multiple application components, multiple development environments, multiple deployment environments, or multiple testing and processing, establishing a dialog (e.g., a negotiation) with one another in order to establish connectivity for transferring data and/or instructions between the applications so as to facilitate performing tasks on the data or portions thereof to accomplish an overall goal. The parameters may include one or more of format, data types, data structures, or commands.

BACKGROUND

The growth of e-business has created a significant need to integrate legacy applications and bring them to the Internet This is because the current trend for new applications is to embrace Web standards that simplify end user application construction and scalability. Moreover, as new applications are created, it is crucial to seamlessly integrate them with existing systems while facilitating the introduction of new business processes and paradigms.

Integrating new applications with existing applications is especially critical since industry analysts estimate that more than seventy percent of corporate data, including data highly relevant to e-commerce, lives on mainframe computers. Moreover, while many e-commerce transactions are initiated on Windows, Mac, and Linux end user platforms, using a variety of Web browsers, and go through Windows NT and Unix servers, they are ultimately completed on mainframe computers, running mainframe applications, and impacting data stored in mainframe databases.

There are e-business pressures to integrate server level applications and bring them to the Internet. However, there is no complete and easy mechanism to integrate or e-business enable the applications. Integration, whether through messaging, procedure calls, or database queries, is key to solving many of today's business problems.

Integrating legacy applications with new software is a difficult and expensive task due, in large part, to the need to customize each connection that ties together two disparate applications. There is no single mechanism to describe how one application may allow itself to be invoked by another.

One consequence is an e-commerce environment of multiple applications, developed by multiple development teams, running on different platforms, with different data types, data structures, commands, and command syntax's. This environment is stitched together with application program interfaces and connectors. Connectors are an essential part of the total application framework for e-commerce. Connectors match interface requirements of disparate applications and map between disparate interfaces.

This growing interconnection of old and new software systems and applications, has led to various middle ware applications and connector applications, interface specifications, interface definitions, and code, especially for the interconnection and interaction of markup languages (such as HTML, XML, Dynamic HTML, WML, and the like), through object oriented languages such as SmallTalk and C++, with languages of legacy application server applications (such as COBOL). These interface specifications, definitions, and code should apply across languages, tools, applications, operating systems, and networks so that an end user experiences the look, feel, and responses of a single, seamless application at her terminal. Instead, the proliferation of standards, protocols, specifications, definitions, and code, e.g., Common Object Request Broker (CORBA), Common Object Model (COM), Object Linking and Embedding (OLE), SOM, ORB Plus, Object Broker, Orbix, has instead created an e-commerce "Tower of Babel."

Examples of application integration are ubiquitous: from installing an ERP system, to updating an Operational Data Store (ODS) with IMS transactions or invoking CRM systems from MQSeries; each of these requires the same basic steps. First, a user must find the entity she wants to communicate with, then she must figure out how to invoke the entity, and finally she must provide translation from one native representation to another. Today, these steps usually require manual investigation and hand coding—and leave the developers with a rat's-nest of hard-to-maintain connections between applications.

Attempts to remedy this situation involve application program interfaces and connectors, which are frequently built on Interface Definition Languages. Interface Definition Languages are declarative, defining application program interfaces, and, in some cases, issues such as error handling. Most Interface Definition Languages are a subset of C++, and specify a component's attributes, the parent classes that it inherits from, the exceptions that it raises, the typed events that it emits, the methods its interface supports, input and output parameters, and data types. The goal of Interface Definition Languages within connectors is to enable collaboration between dissimilar applications without hard coded application program interfaces.

Ideally, the interface definition language, and the connector of which it is a part, should facilitate full run-time software application collaboration through such features as Method invocation with strong type checking, Run-time method invocation with greater flexibility and run time binding, High level language binding, with the interface separated from the implementation.

An interface repository containing real time information of server functions and parameters.

Additionally, the connector and its interface definition language, should be fast, efficient, scalable, portable, support metaclasses, support syntactic level extensions, and support semantic level extensions.

SUMMARY OF THE INVENTION

The problems associated with integrating new applications, for example, e-commerce applications, with legacy applications are obviated by the Common Application Metamodel tool, method, and system described herein. The Common Application Metamodel method, tool, and system of the invention facilitate tooling solutions, data translation, and communication and collaboration between dissimilar and disparate applications, as well as full run-time software application collaboration through an interface with the application server interface domain. This is accomplished through metadata interchange information, method invocation with strong type checking, run-time method invocation, run time binding, and high level language binding, with the interface separated from the implementation, and an interface repository containing real time information of client and server interface parameters.

Additionally, the tool, method, and system of the invention provide fast, efficient, and scalable interconnectivity independently of any tool or middleware, are reusable and portable, and support metaclasses, syntactic level extensions, and semantic level extensions, and are independent of any particular tool or middleware.

The Common Application Metamodel tool, method, and system is especially useful for providing a data transformer that is bi-directional between a client application and a server application, transmitting commands and data both ways between, for example, a Java, HTML, XML, C, or C++ application and a COBOL, PL/I, or High Level Assembler application, or, between an HTML or XML application and a Java, C, or C++ application, or between a Java application and a C or C++ application.

In a preferred embodiment of the invention, the metamodel is used in an transaction message management environment for processing an application request on an end user application and an application server where the server a transaction manager. In this embodiment an application request is initiated on the end user application in a first language with a first application program, and transmitted to the server where it is converted from the first language of the first end user application to a form for the transaction manager running on the application server. The application request is processed on the application server and a response is transmitted from the application server to the end user application. The response to the application request is converted from the language and form of transaction manager running on the application server to the first language of the first end user application. The end user application and the application server have at least one connector therebetween. In this way steps of (i) converting the application request from the first language of the first end user application as a source language to the language (including the form of the transaction message manager) running on the application server as a target language, and (ii) converting a response to the application request from the language (including the form of the transaction message manager) running on the application server as a source language to the first language of the first end user application as a target language, each comprise the steps of: invoking connector metamodels of respective source language and target transaction manager; populating the connector metamodels with metamodel data of each of the respective source language and target transaction manager, the metamodel data of the target transaction manager including control data, state data, and user data; and converting the source language to the transaction manager. To be noted is that the metamodel data of the target transaction manager includes control data, state data, and user data One embodiment of the invention is a method of processing a transaction on or between an end user application and one or more application servers. The method comprises the steps of initiating the transaction on the end user application in a first language with a first application program, transmitting the transaction to the server, and converting the transaction from the first language of the first end user application to a language running on the application server. Typically, as described above, the client will be a thin client or a Web browser, the application running on the client will be a Web browser application or a thin client connectivity application, and the language of the client application will be Java, C, C++, or a markup language, as HTML or a derivative of HTML, such as XML or Dynamic HTML or WML, or the like, and the language running on the server may be COBOL, PL/I, HLASM (High Level Assembler) or the like. The invention facilitates transformers which convert the transaction from the first language of the end user application to a language running on the application server. After conversion, the converted transaction is processed on the application server.

The application processes the request and then sends the response from the application server back to the end user application. Typically, as described above, the application server will be running a COBOL based application, and the client will be a thin client written in Java or C or C++, or a Web browser, running a Web browser application or a thin client connectivity application, in a markup language, as HTML or a derivative of HTML, such as XML or Dynamic HTML, or the like. The invention provides data transformers which convert the response from the language or languages running on the application server or servers to the first language of the first end user application.

The end user application and the application server have at least one data transformer between them. In this way, the steps of (i) converting the request from the first language of the first end user application as a source language to the language running on an application server as a target language, and (ii) converting the response from the language running on the application server, as a subsequent source language, back to the first language of the first end user application, as a subsequent target language, each comprise the steps of invoking type descriptor and language metamodels of respective source and target languages, populating the metamodels with each of the respective source and target languages' data items and types, and converting the source language to the target language.

The end user application is, frequently, a web browser or a thin client. When the end user application is a Web browser, the end user is connected to the application server through a web server. According to a further embodiment of the invention, the web server may comprise the connector, or data transformer. The data transformer integrated with the Web server may directly convert the request, transaction, or message from a browser oriented form to an application server language or to an intermediate, business or commerce oriented markup language, such as XML.

The CAM metamodel used to construct the converter comprises an invocation metamodel, an application domain interface metamodel, a language metamodel, and a type descriptor metamodel. Exemplary invocation metamodel includes information chosen from the group consisting of message control information, security data, transactional semantics, trace and debug information, pre-condition and post-condition resources, and user data, etc. Exemplary application domain interface metamodel comprises information chosen from input parameter signatures, output parameter signatures, and return types. Application domain interface metamodel uses one or more language metamodels, such as COBOL and PL/I metamodels.

The type descriptor metamodel defines physical realizations, storage mapping, data types, data structures, and realization constraints.

The method of the invention is applicable to situations where one of the source or target languages is object oriented, and the other of the target or source languages is not object oriented. In this situation, the language metamodel and the type descriptor metamodel together map encapsulated objects of the object oriented language into code and data of the language that is not object oriented. Additionally, the language metamodel and the type descriptor metamodel maps object inheritances of the object oriented language into references and pointers in the language that is not object oriented. The method of the invention is also applicable to situations where different object oriented languages are running on different platforms, and encapsulated objects of the source language (code and data) are mapped into encapsulated objects of the target language. The method of the invention is also applicable where different procedural languages are running on different platforms or applications and commands and data of the source procedural language are mapped into the target procedural language.

According to the method of the invention, there may be a plurality of applications for vertical (sequential, conditional, or dependent) processing, for horizontal (parallel in time) processing, or both horizontal and vertical processing. This is to support rich transactions to and through multiple hierarchical levels and multiple parallel sequences of processing. This may be the case in business to business transactions drawing upon financial, manufacturing, scheduling, supply, and shipping databases and servers, and utilizing various commercial security instruments.

A further aspect of the invention is a client-server processing system having a client, a server, and at least one transformer between the client and one or more servers, A still further aspect of the invention is a processing system configured and controlled to interact with a client application. In this aspect of the invention, the system comprises, a server, and at least one transformer between the server and the client application, where the client has an end user application, and is controlled and configured to initiate a request with the server in a first language with a first application program and to transmit the request through a transformer to the server or servers. The server processes the request in a second software application, using a second language, and returns a response to the client through a transformer.

A further aspect of the invention is a groupware system having a plurality of e-mail enabled end user applications, such as e-mail, word processing, spreadsheet, simple database management (such as Lotus Approach or Microsoft Access), graphics and graphics editing, audio and audio editing, and computer-telephony integration ("CTI"), along with client level content database client services and content replication client services. Groupware integrates these e-mail enabled applications through one or more transformers and application program interfaces with transport services, directory services, and storage services, including content servers and replication servers. The groupware system is configured and controlled to communicate among disparate end user applications, among disparate servers, and between disparate servers and end user applications. The groupware system comprises at least one transformer between a server and an end user application. The end user application is controlled and configured to participate with a server in a first language of a first application program and the server is configured and controlled to participate with the client in a second language of a second program.

The transformer is configured and controlled to receive a request from the end user application, and convert the request from the first language of the first end user application to a language running on the server. The server is configured and controlled to receive the converted request from the transformer and process the request in a second language with a second application program residing on the server, and to thereafter transmit a response through a transformer back to the end user application.

A still further embodiment of the invention is the provision of rich transaction processing. Rich transactions are nested transactions that span to, through, and/or across multiple servers. The spanning across nested servers may be horizontal, that is parallel dependent transactions, or vertical, that is, serial dependent transactions. Rich transactions may be long lived, on-going transactions, or complex business-to-business transactions, especially those with multiple dependencies or contingencies, volume and prompt payment discounts, late delivery and late payment penalties, and with financial processing, such as electronic letters of credit, electronic bills of lading, electronic payment guarantees, electronic payment, escrow, security interests in the goods, and the like. In a rich transaction environment, some transaction servers may be positioned as clients with respect to other transactions for certain sub transactions making up the rich transaction.

A still further embodiment of the invention is a tool, that is, a software developer's kit, characterized in that the program product is a storage medium (as a tape, floppy disks, a CD-ROM, or a hard drive or hard drives on one of more computers) having invocation metamodels, application domain interface metamodels, and language metamodels, and computer instructions for building a metamodel repository of source and target language metamodels.

The program product also contains computer instructions for building connector stubs from the metamodels. The program product further carries computer instructions to build a transformer.

While the invention has been described in summary form as having a single level of connectors, it is, of course, to be understood that such connectors may be present at various levels in the processing hierarchy, for example between Web Clients and Web servers, between web servers and application servers, between application servers and database servers, and between application servers or database servers or both and various specialized repositories.

It is also to be understood, that while the invention has been summarized in terms of individual clients and individual servers, there may be multiple clients, multiple servers, and applications that function as both clients and servers, as exemplified by groupware applications, and there might be multiple parallel lines and/or multiple hierarchical levels of application servers, data servers, and databases, as in systems for rich transactions.

THE FIGURES

Various elements of the invention are illustrated in the FIGURES appended hereto.

Figure 5:
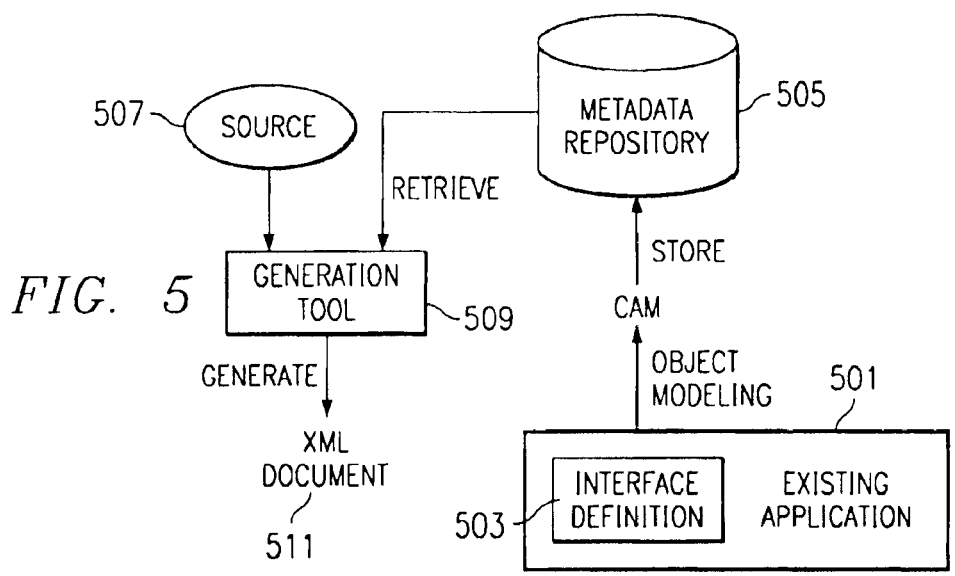

FIG. 5 illustrates how a tool can be used to generate an XML document describing application program interface. First, an object model, i.e., a CAM metamodel, is created to capture interface definitions about an application server. Then a tool reads and parses the source definitions of an application program and generates an XML document by retrieving the object model's information from a repository.

Figure 6:
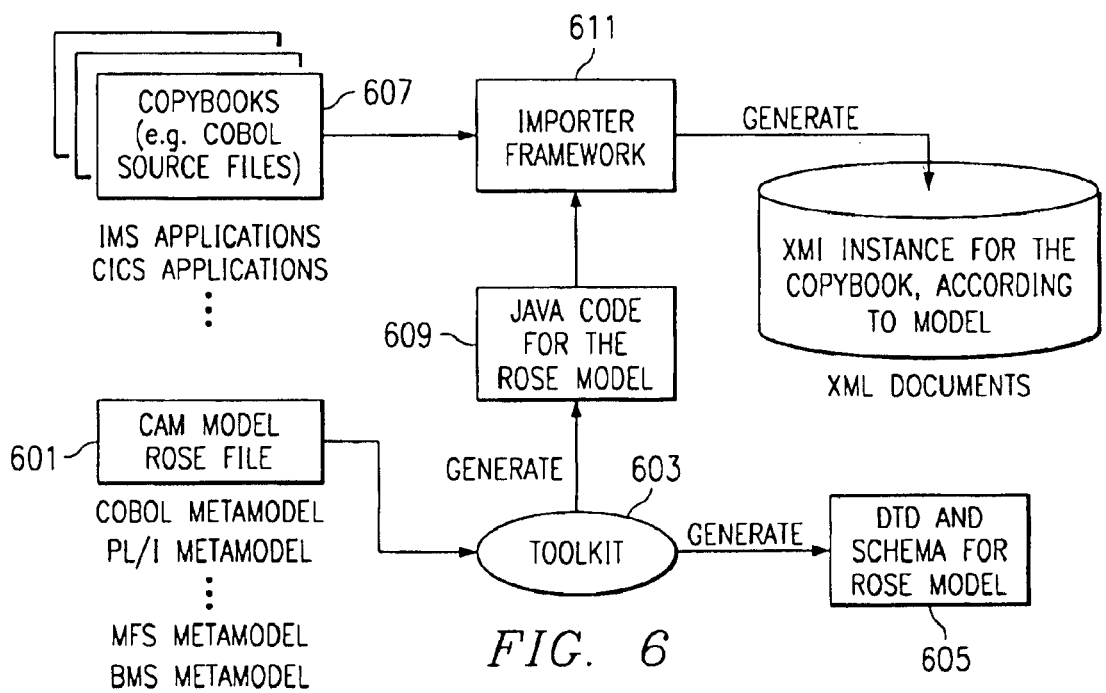

FIG. 6 illustrates a development phase scenario where a Common Application Metamodel Rose file, e.g., a COBOL metamodel, a PL/I metamodel, an MFS metamodel, a BMS model, or the like is read into a toolkit, to generate a DTD and XML schema and Java code for a Rose model. A source file of an application, as a COBOL source file, a PL/I source file, an MFS source file, a BMS source file, or the like, is read into an importer. The importer parses the source code and generates, as output, an XMI instance file, i.e., XML documents, by reading in the Java code of the Rose model of the application source files.

Figure 7:
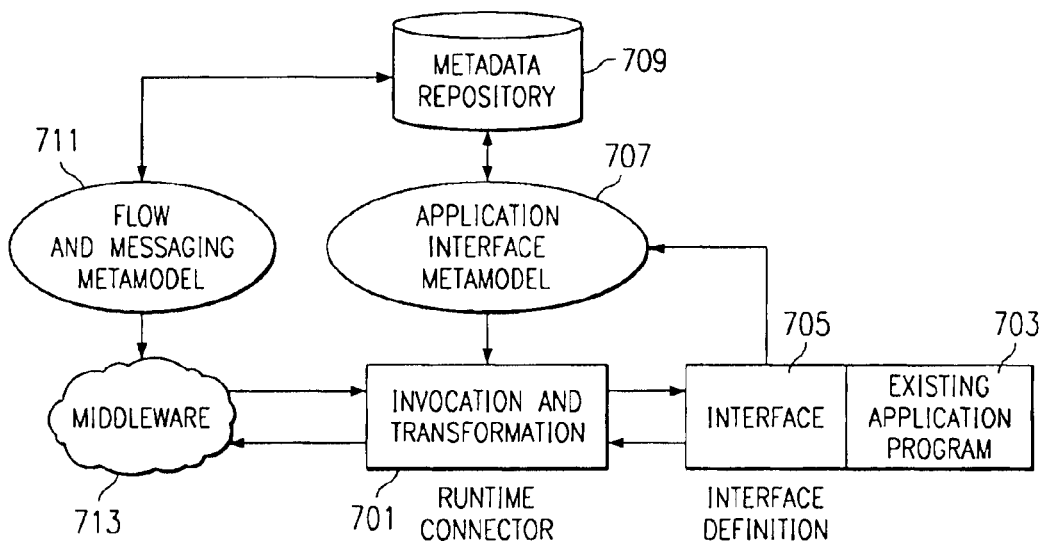

FIG. 7 illustrates a metamodel for application interfaces, which enables integration of application components into an event based messaging model, including flow models. The flow and messaging middle invokes applications through the application interface. These interfaces are access points to the applications through which all input and output is connected to the middleware. The interfaces are described in terms of the Application Interface Metamodels. Transformation processing according to he metamodel could take place in source/client applications, target applications, or a gateway.

Figure 8:
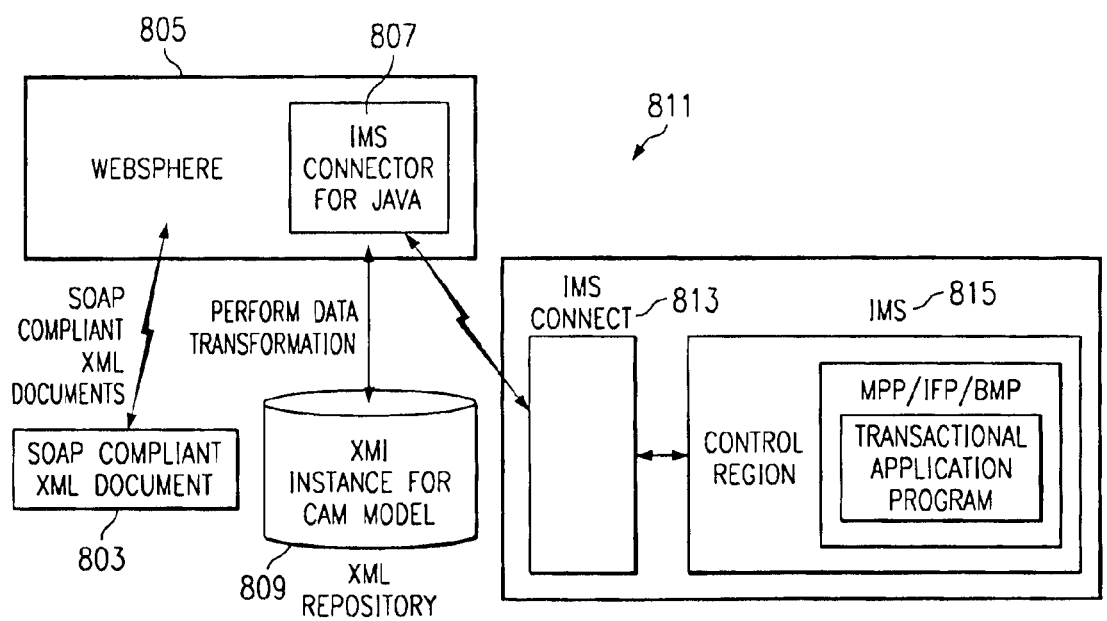

FIG. 8 illustrates the application of the Common Application Metamodel during execution time. As shown, the CAM model facilitates connectivity between a back-end IMS application and a Web file (e.g., SOAP complaint XML documents). This is accomplished by using information captured in the model to perform data transformations from one platform to another in a mixed language environment shown.

Figure 9:
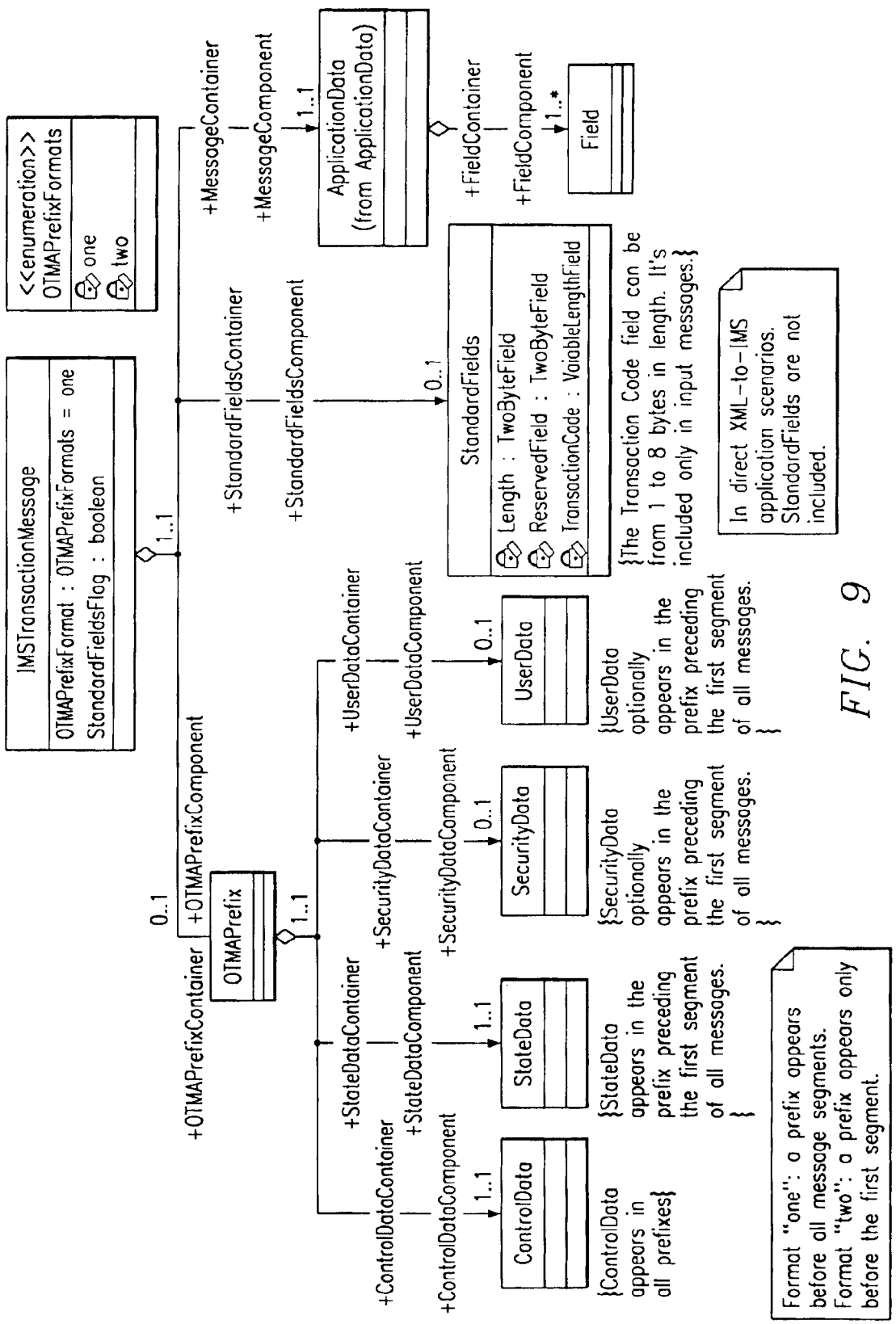

FIG. 9 illustrates the Metamodel for an IMS Transaction Message, containing three types of transaction messages, the IMS-OTMA Messages with a prefix, IMS messages without a prefix where a default OTMA prefix can be built by IMS, and IMS basic messages to be sent to application programs, directly.

Figure 10:
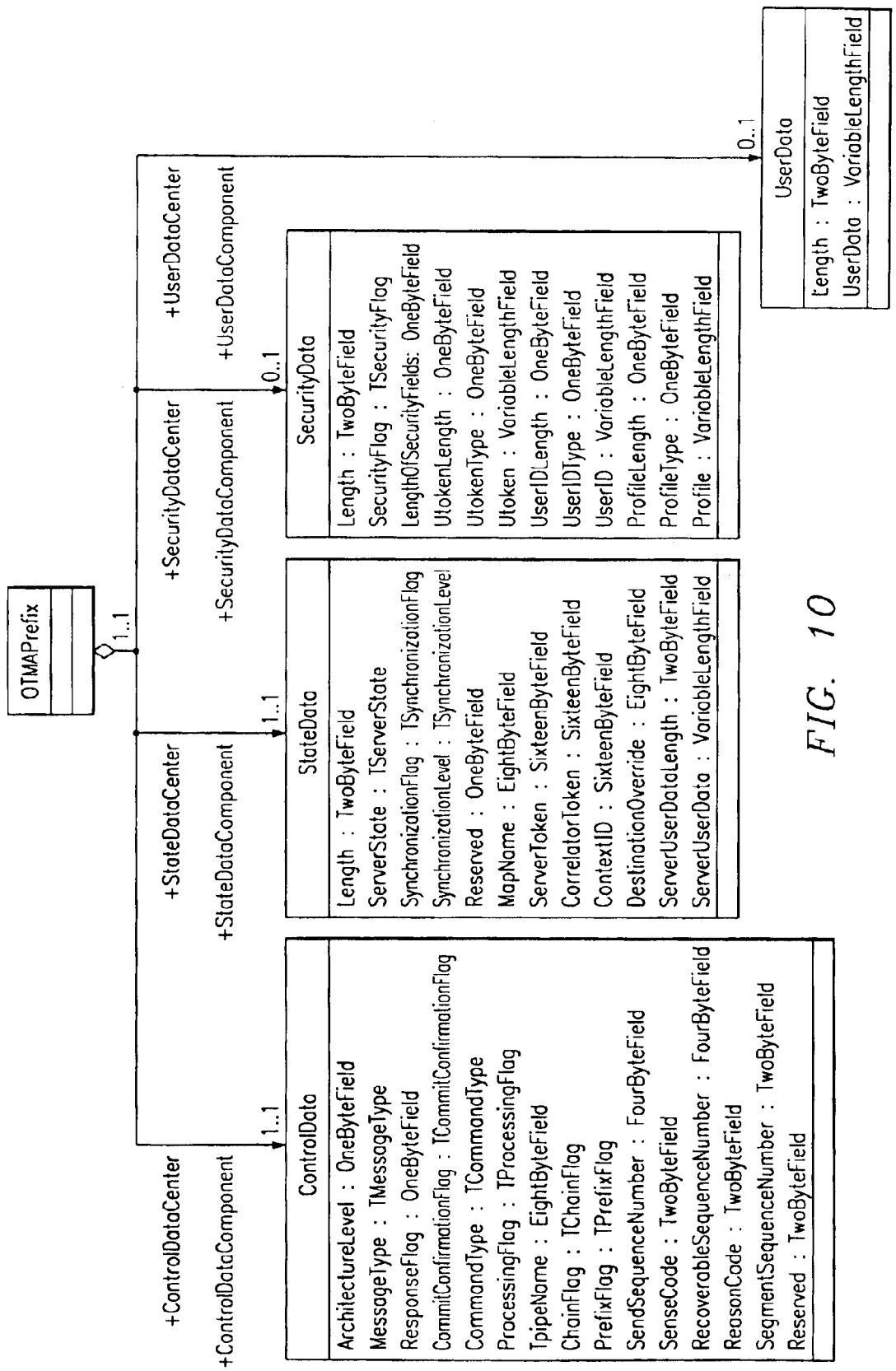

FIG. 10 illustrates the OTMA prefix metadata model.

FIG. 11 illustrates the OTMA prefix in control data defined data types.

Figure 12:
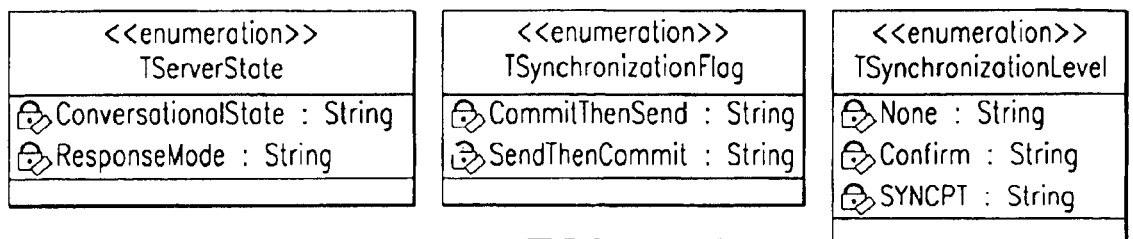

FIG. 12 illustrates the OTMA prefix in state defined data types.

Figure 13:
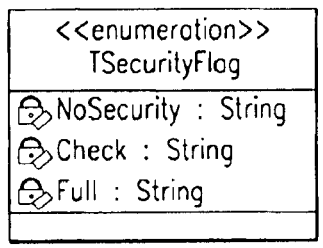

FIG. 13 illustrates the OTMA prefix in security defined types.

Figure 14:
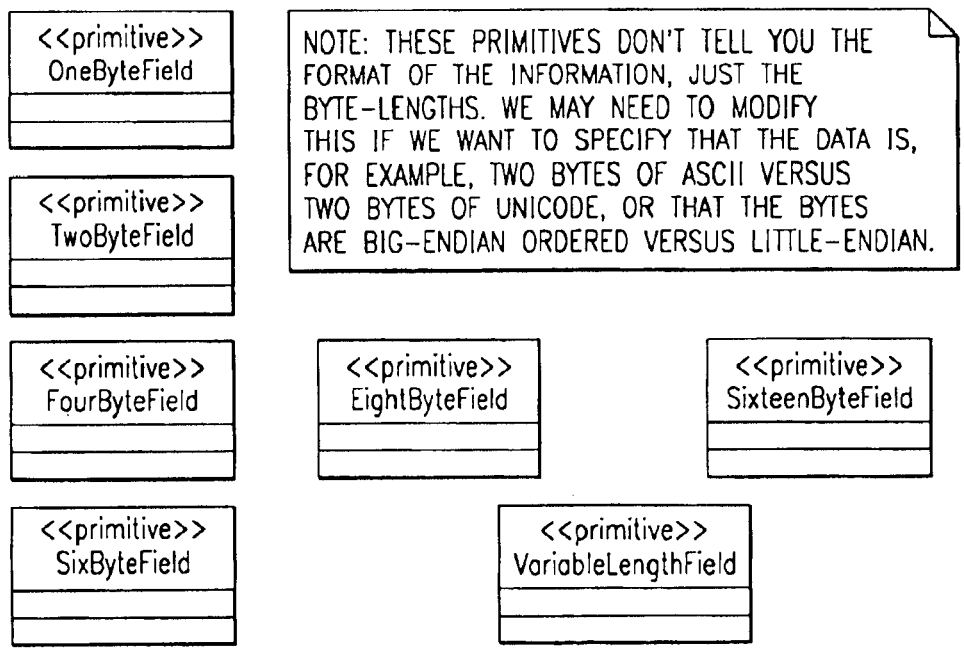

FIG. 14 illustrates the IMS Messages primitives in the IMS Metamodel.

DETAILED DESCRIPTION OF THE INVENTION

Definitions. As used herein the following terms have the indicated meanings. "Handshaking" is the exchange of information between two applications and the resulting agreement about which languages, capabilities, and protocols to use that precedes each connection.

An "application program interface" (API) is a passive specific method prescribed by a computer operating system or by another application program by which a programmer writing an application program can make requests of the operating system or another application. Exemplary is SAX (Simple API for XML), an connector that allows a programmer to interpret a Web file that uses the Extensible Markup Language, that is, a Web file that describes a collection of data. SAX is an event-driven interface. The programmer specifies an event that may happen and, if it does, SAX gets control and handles the situation. SAX works directly with an XML parser.

A "connector" as used herein is a dynamic, run-time, interface between platforms that stores the functions and parameters of the target platform or program, and binds with the target platform program in real time.

A "stub" is a small program routine that provides static interfaces to servers. Precompiled stubs define how clients invoke corresponding services on the server. The stub substitutes for a longer program on the server, and acts as a local call or a local proxy for the server object. The stub accepts the request and then forwards it (through another program) to the remote procedure. When that procedure has completed its service, it returns the results or other status to the stub which passes it back to the program that made the request. Server services are defined in the stub using an Interface Definition Language ("IDL"). The client has an IDL stub for each server interface that it accesses and includes code to perform marshaling. Server stubs provide static interfaces to each service exported by the server.

"CICS" (Customer Information Control System) is the online transaction processing program from IBM that, together with the Common Business Oriented Language programming language, is a set of tools for building customer transaction applications in the world of large enterprise mainframe computing. Using the programming interface provided by CICS to write to customer and other records (orders, inventory figures, customer data, and so forth) in a CICS, a programmer can write programs that communicate with online users and read from a database (usually referred to as "data sets") using CICS facilities rather than IBM's access methods directly. CICS ensures that transactions are completed and, if not, it can undo partly completed transactions so that the integrity of data records is maintained. CICS products are provided for OS/390, UNIX, and Intel PC operating systems. CICS also allows end users to use IBM's Transaction Server to handle e-business transactions from Internet users and forward these to a mainframe server that accesses an existing CICS order and inventory database.

"IMS" (Information Management System) is the system from IBM that, together with IBM's Enterprise Systems Architecture (IMS/ESA) provides a transaction manager and a hierarchical database server.

"MQ" is the MQSeries IBM software family whose components are used to tie together other software applications so that they can work together. This type of application is often known as business integration software or middleware. Functionally, MQSeries provides a communication mechanism between applications on different platforms, an integrator which centralizes and applies business operations rules, and a workflow manager which enables the capture, visualization, and automation of business processes. MQSeries connects different computer systems, at diverse geographical locations, using dissimilar IT infrastructures, so that a seamless operation can be run. IBM's MQSeries supplies communications between applications, and between users and a set of applications on dissimilar systems. Additionally, MQSeries' messaging scheme requires the application that receives a message to confirm receipt. If no confirmation materializes, the message is resent by the MQSeries.

"Rose" is an object-oriented Unified Modeling Language (UML) software design tool intended for visual modeling and component construction of enterprise-level software applications. It enables a software designer to visually create (model) the framework for an application by blocking out classes with actors (stick figures), use case elements (ovals), objects (rectangles) and messages/relationships (arrows) in a sequence diagram using drag-and-drop symbols. Rose documents the diagram as it is being constructed and then generates code in the designer's choice of C++, Visual Basic, Java, Oracle 8, Corba or Data Definition Language.

Figure 1:
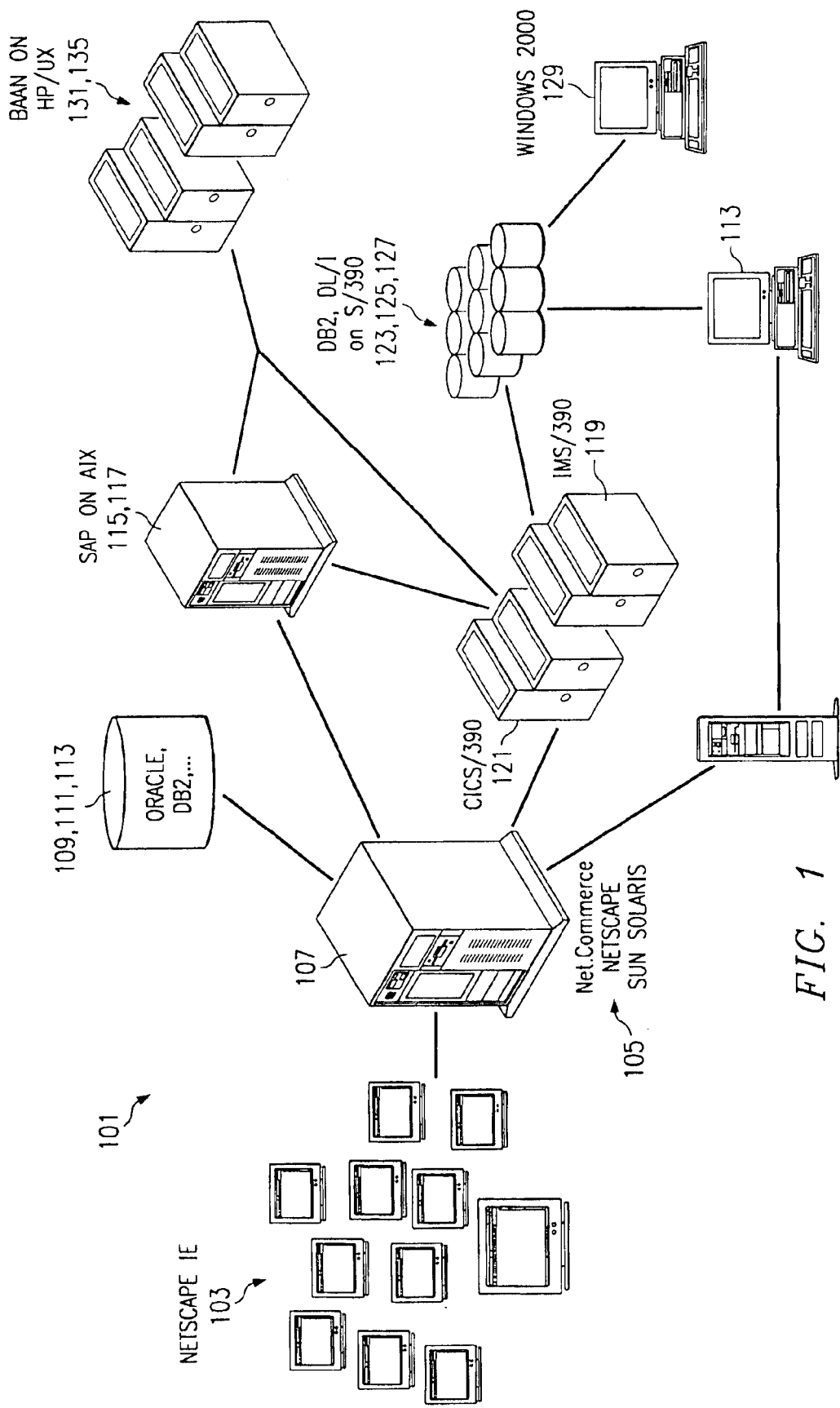
FIG. 1 illustrates a system with multiple application components, including a Netscape Internet Explorer browser, Net.Commerce on a Sun Solaris server, Oracle and DB2 on a database server, SAP running on AIX, a CICS 390 server, an IMS 390 server, DB2 and DL/I on a S/390 platform, a Windows 200 client, and Baan running on an HP Unix server.
Figure 2:
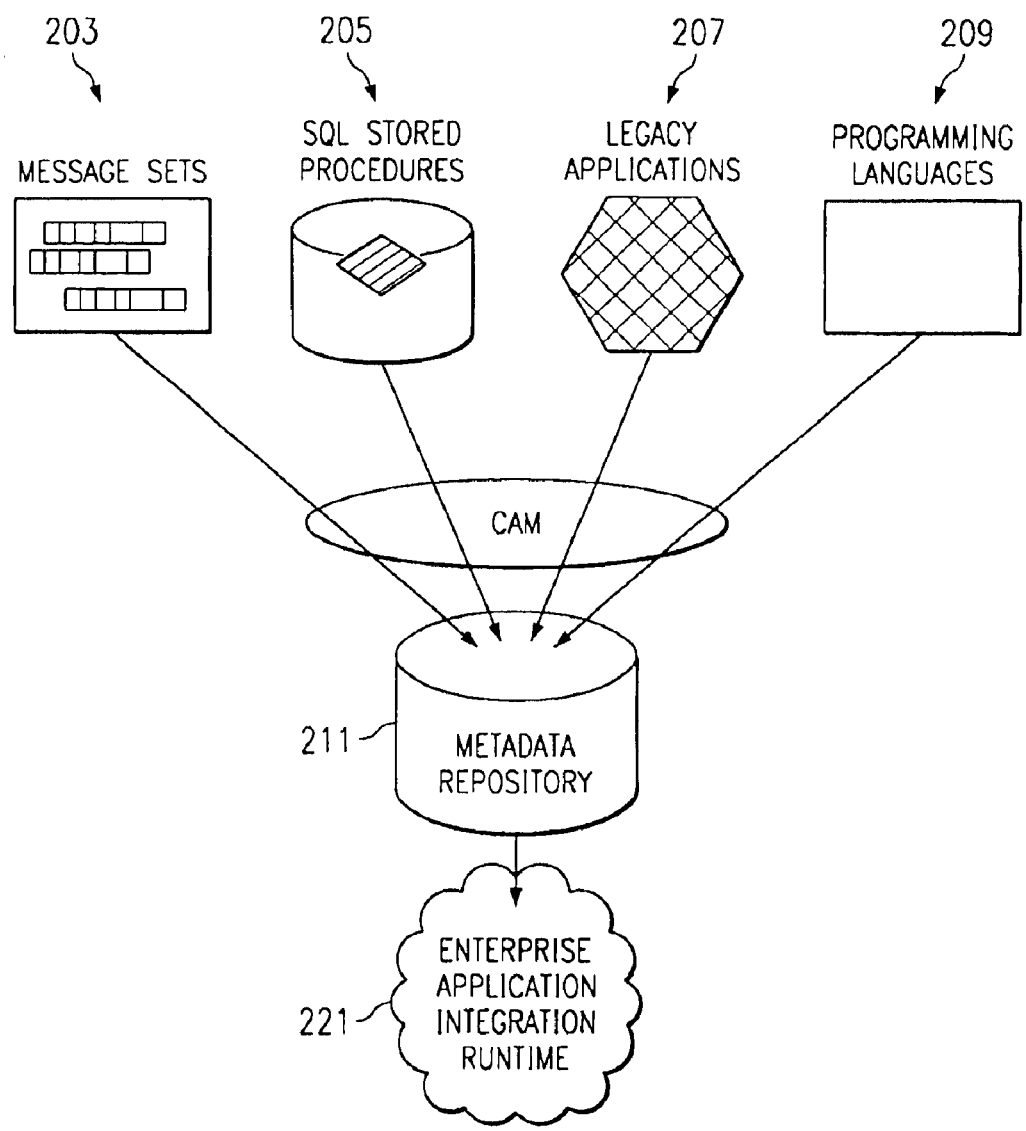
FIG. 2 illustrates the roles of message sets, SQL stored procedures, legacy applications, and programming languages as inputs to the metadata repository of the Common Application Metamodel to facilitate enterprise application integration at run time.

Common Application Metamodel Overview. The Common Application Metamodel (CAM) brings interconnectivity to the environment illustrated in FIG. 1. FIG. 1 illustrates a typical system 101 with multiple application components, including a Netscape Internet Explorer browser 103, Net.Commerce 105 on a Sun Solaris server 107, Oracle 109 and DB2 111 on a database server 113, SAP 115 running on AIX 117, a CICS 390 server 119, an IMS 390 server 121, DB2 123 and DL/I 125 on a S/390 platform 127, a Windows 2000 client 129, and Baan 131 running on an HP Unix server 133. The Common Application Metamodel (CAM) is metadata interchange method, tool, and system for marshaling and applying information needed for accessing enterprise applications, such as in FIG. 1, in a source language and converting them to a target language. CAM consists of language metamodels and application domain interface metamodels, as shown in FIG. 2, which illustrates the roles of message sets 203, SQL stored procedures 205, legacy applications 207, and programming languages 209 as inputs to the metadata repository 211 of the Common Application Metamodel to facilitate enterprise application integration 221.

Figure 3:
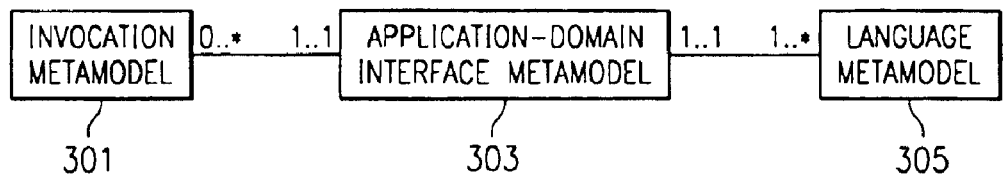
FIG. 3 illustrates that the Common Application Metamodel of the invention consists of three kinds of metamodels, i.e., an invocation metamodel, an application-domain interface metamodel, and a language metamodel. For any given application-domain metamodel it may use one or many language metamodels, and there could be zero or many invocation metamodels.

Exemplary metamodels include C, C++, Java, COBOL, PL/I, HL Assembler, IMS transaction messages, IMS MFS, CICS BMS, and MQSeries messages models, as shown in FIG. 3, which illustrates the Common Application Metamodel of the invention, with an invocation metamodel 301, an application-domain interface metamodel 303, and a language metamodel 305.

Figure 4:
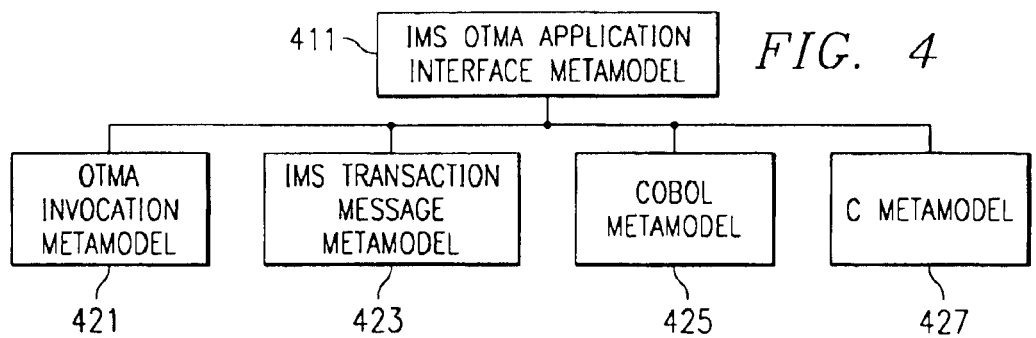
FIG. 4 illustrates an IMS OTMA metamodel, with an OTMA Invocation Metamodel, an IMS Transaction Message Metamodel application interface, which could use a COBOL Metamodel, a C Metamodel, or other language metamodels.

FIG. 4 illustrates an IMS OTMA application interface metamodel 411, with an OTMA Invocation Metamodel 421, an IMS Transaction Message Metamodel 423, a COBOL Metamodel 425, and a C Metamodel 427.

FIG. 5 illustrates the flow of information from an existing application 501, through an interface 503 to an object model containing application interface metadata. This application interface metamodel is stored in the metadata repository 505, and, at an appropriate time, retrieved from the metadata repository 505, combined with a source program 507 in a generation tool 509, and used to generate a target file 511, as an XML file, i.e., an XMI instance file. CAM is highly reusable and independent of any particular tool or middleware.

Development Stage. With CAM, tooling can now easily provide solutions to access enterprise applications, e.g. IMS applications. By parsing each source file and generating XML documents based on the CAM model, COBOL copybook, PL/I copybook, MFS Source, BMS Source, etc., tools can provide connector solutions to IMS, and CICS, etc.

In this regard, FIG. 6 illustrates a development phase scenario where a Common Application Metamodel Rose file 601, e.g., a COBOL metamodel, a PL/I metamodel, an MFS metamodel, a BMS model, or the like is read into a toolkit 603, to generate a DTD and schema for a Rose model and Java code for a Rose model 605. A source file of an application 607, as a COBOL source file, a PL/I source file, an MFS source file, a BMS source file, or the like, and the Java code for the Rose model 609 are read into an Importer 611. The importer parses the source code and provides, as output, an XMI instance file 613, i.e., XML documents, of the application source files.

FIG. 7 shows a CAM metamodel for application interfaces. This Figure depicts a runtime connector 701 with invocation and transformation capabilities, interfacing with an existing application program 703 through an interface 705 containing the existing application program's interface definition, in accordance with the application interface metamodel 707. The Application Interface metadata is stored in a metadata repository 709.

The flow and messaging middleware 713 invokes applications 703 through the application interfaces 705. These interfaces 705 are the access points to the applications 703 through which all input and output is connected to the middleware 713. The interfaces 705 are described in terms of the Application Interface Metamodel. Transformation processing according to the metamodel could take place in source/client applications, target applications, or a gateway.

Because CAM also provides physical representation of data types and storage mapping to support data transformation in an enterprise application integration environment, it enables Web services for enterprise applications.

At development time CAM captures information that facilitates:

a). connector and/or connector-builder tools, b). data driven impact analysis for application productivity and quality assurance, and c). viewing of programming language data declarations by developers.

The CAM metamodel files are inputs to toolkits used to generate DTD files, XML schemas, and Java classes which represent the CAM model. Importers parse each source file (e.g. COBOL or PL/I copybook, MFS source, and BMS, etc.), and then generate XML documents (i.e. XML instance files) based on Java classes generated by the XMI/MOF2 toolkit.

Run Time. At run time CAM provides information which facilitates transformation in an enterprise application integration environment where it provides data type mapping between mixed languages, facilitates data translations from one language and platform domain into another.

FIG. 8 illustrates the application of the Common Application Metamodel during run time. As shown, SOAP compliant XML documents 803 are received in, for example, IBM WebSphere middleware, 805, which contains an IMSConnector for Java 807, and is in contact with an XML Repository 809, containing the XMI instance files for the CAM model. The IBM WebSphere middleware sends the transformed file to the IMS system 811, which contains an instance of IMS Connect 813 and the IMS transactional application program 815. CAM facilitates connectivity between the back-end IMS application 815 and the Web file (e.g., SOAP compliant XML documents) 803. The CAM accomplishes this by using CAM model information (from repository 809) to perform data transformations from one platform to another in the mixed language environment shown.

Type Descriptor Metamodel. One important feature provided by CAM is the Type Descriptor metamodel. The Type Descriptor metamodel defines the physical realization, storage mapping, and the constraints on the realization (such as justification). This metamodel provides a physical representation of individual fields of a given data structure. When supporting data transformation in an enterprise application integration environment, the model provides data type mapping between mixed languages. It also facilitates data translations from one language and platform domain into another. The metamodel is used for runtime data transformation (or marshaling) with a language-specific metamodel for overall data structures and field names.

1. Common Application Metamodel for Application Interfaces

The interconnection of disparate and dissimilar applications running on different software platforms, as shown in FIG. 1, with different operating systems, physical platforms, and physical realizations is accomplished through connectors that incorporate the interconnection metadata. Connectors are a central part of the application framework for e-business. The end user demand is to connect to anything interesting as quickly, and as easily, as possible.

A connector is required to match the interface requirements of the adapter and the legacy application. It is also required to map between the two interfaces. Standardized metamodels for application interfaces presented herein allow reuse of information in multiple connector tools. These standardized metamodels not only reduce work to create a connector, but also reduce work needed to develop connector builder tools.

The connectors built using the common application metamodel of our invention provide interoperability with existing applications. The connectors support leveraging and reuse of data and business logic held within existing application systems. The job of a connector is to connect from one application system server "interface" to another. Therefore, an application-domain interface metamodel describes signatures for input and output parameters and return types for a given application system domain (e.g. IMS, MQSeries); it is not for a particular IMS or MQSeries application program. The metamodel contains both syntactic and semantic interface metadata.

1. a. End-to-End Connector Usage Using Common Application Metamodel

The Common Application Metamodel (CAM) consists of meta-definitions of message signatures, independent of any particular tool or middleware. Different connector builder tools can use this information to ensure the "handshaking" between these application programs, across different tools, languages, and middleware. For example, if you have to invoke a MQSeries application, you would need to build a MQ message using data from a GUI tool and deliver it using the MQ API. Similarly, when you receive a message from the MQSeries application, you would need to get the buffer from MQSeries, parse it and then put it into a GUI tool data structure. These functions can be designed and implemented efficiently by a connector builder tool using CAM as standardized metamodels for application interfaces.

CAM can be populated from many sources, including copy books, to generate HTML forms and JavaServer Page (JSP) for gathering inputs and returning outputs. An example of a connector as depicted in the previous figure is that the flow and message middleware makes a function call to an enterprise application by calling the connector which then calls the enterprise application API. The connector does language and data type mappings, for example, to translate between XML documents and COBOL input and output data structures based on CAM. Connectors and CAM provide the end-to-end integration between the middleware and the enterprise applications.

Using IMS as an example. Let's say that you must pass an account number to an IMS transaction application program from your desktop to withdraw $50.00. With CAM and a connector builder tool, you will first generate an input HTML form and an output JSP; and develop a middleware code necessary to support the request. The desktop application fills the request data structure (i.e. an input HTML form) with values and calls the middleware. The middleware service code will take the data from the GUI tool, build an IMS Connect XML-formatted message, and deliver the message to the IMS gateway (i.e. IMS Connect) via TCP/IP. IMS Connect translates between the XML documents and the IMS message data structures in COBOL using the metadata definitions captured in CAM. It then in turn sends the IMS message data structures to IMS via Open Transaction Manager Access (OTMA). The IMS COBOL application program runs, and returns the output message back to the middleware service code via IMS Connect. The middleware service code gets the message and populates the output JSP page (i.e. previously generated GUI tool reply data structures) with the reply data. The transaction output data will then be presented to the user.

2. Common Application Metamodel

CAM is used to describe information needed to easily integrate applications developed in common programming models with other systems. The CAM metamodel can be used for both synchronous and asynchronous invocations.

2. a. Common Application Metamodel

The common application metamodel depicted as follows consists of an invocation metamodel and an application-domain interface metamodel which uses language metamodels. For any given application-domain interface metamodel, it may use one or many language metamodels, but, there could be zero or more invocation metamodels.

The common connector metamodel is illustrated in FIG. 3. It has an Invocation Metamodel 301, an Application-Domain Interface Metamodel 303, and a Language Metamodel 305.

2. a. i. Invocation Metamodel

The invocation metamodel 301 consists of one or more of the following possible metadata elements. However, for a particular invocation, it could include only one or many of the following metadata elements.

Message-control information. This includes message control information, such as the message connection name, message type, sequence numbers (if any), and various flags and indicators for response, commit-confirmation, and processing options by which a client or server can control message processing to be synchronous or asynchronous, etc.

The connection name can be used by the application system server to associate all input and output with a particular client. The message type specifies that the message is a response message; or that commit is complete. It can also indicate server output data to the client, or client input data to the server.

Security data—This includes authentication mechanism, and security data, e.g. digital certificates, identity, user name and password, etc. It may also include authorization information to indicate whether the data can be authorized via a role based or ACL (access control list) based authorization.

Transactional semantics—This will carry transaction information, e.g. local vs. global transaction; two-phase commit vs. one-phase commit, and transaction context, etc.

Trace and debug—Trace and debugging information are specified as part of the metamodel.

Precondition and post-condition resource—This describes application state precondition and post-condition relationships.

User data—This includes any special information required by the client. It can contain any data.

2. a. ii. Application-Domain Interface Metamodel

The application-domain interface metamodel 303, as discussed earlier, describes signatures for input and output parameters and return types for application system domains.

2. a, iii. Language Metamodel

The language metamodel 305, e.g. COBOL metamodel, is used by enterprise application programs to define data structures (semantics) which represent connector interfaces. It is important to connector tools to show a connector developer the source language, the target language, and the mapping between the two. The CAM language metamodel also includes the declaration text in the model which is not editable (i.e. read-only model). Because the connector/adapter developer would probably prefer to see the entire COBOL data declaration, including comments and any other documentation that would help him/her understand the business role played by each field in the declaration.

The language metamodel is also to support data driven impact analysis for application productivity and quality assurance. (But, it is not the intention of the CAM to support reproduction of copybooks.)

The language metamodels describing connector data are listed as follows:

C
C++
COBOL
PL/I

2. a. iv. Type Descriptor Metamodel

The Type Descriptor metamodel is language neutral and defines the physical realization, storage mapping and the constraints on the realization such as justification. This metamodel provides physical representation of individual fields of a given data structure. The type descriptor metamodel is to support data transformation in an enterprise application integration environment to provide data types mapping between mix languages. It also facilitates data translations from one language and platform domain into another. This metamodel will be used as a recipe for runtime data transformation (or marshaling) with language specific metamodel for overall data structures and fields names.

3. An Example of Common Connector Metamodel

IMS OTMA (Open Transaction Manager Access) is a transaction-based, connectionless client/server protocol within an OS/390 sysplex environment. An IMS OTMA transaction message consists of an OTMA prefix, plus message segments for input and output requests. Both input and output message segments contain llzz (i.e. length of the segment and reserved field), and application data. Only the very first input message segment will contain transaction code in front of the application data. IMS transaction application programs can be written in a variety of languages, e.g. COBOL, PL/I, C, and Java, etc. Therefore, the application data can be in any one of these languages.

As shown in FIG. 4, an IMS OTMA connector metamodel 401 is composed of an invocation metamodel 403 and an IMS transaction message metamodel 405, as well as a COBOL metamodel 407 and a C metamodel 409. As depicted in FIG. 4, the invocation metamodel 401 is the OTMA prefix, and the IMS transaction message metamodel 405 is the application-domain interface metamodel for the IMS application system which uses language metamodels. Metamodels for COBOL 407 and C 409 are shown.

4. Type Descriptor Metamodel

The type descriptor metamodel presents a language and platform independent way of describing implementation types, including arrays and structured types. This information is needed for marshaling and for connectors, which have to transform data from one language and platform domain into another. Inspections of the type model for different languages can determine the conformance possibilities for the language types. For example, a long type in Java is often identical to a binary type (computational-5) in COBOL, and if so, the types may be inter-converted without side effect. On the other hand, an alphanumeric type in COBOL is fixed in size and if mapped to a Java type, loses this property. When converted back from Java to COBOL, the COBOL truncation rules may not apply, resulting in computation anomalies. In addition, tools that mix languages in a server environment (e.g., Java and COBOL in CICS and IMS) should find it useful as a way to determine how faithfully one language can represent the types of another.

Therefore, an instance of the type descriptor metamodel describes the physical representation of a specific data type for a particular platform and compiler.

4. a. TDLang Metamodel

The TDLang metamodel serves as base classes to CAM language metamodels by providing a layer of abstraction between the Type Descriptor metamodel and any CAM language metamodel. All TDLang classes are abstract and common to all the CAM language metamodels. All associations between TDLang classes are marked as "volatile," "transient," or "derived" to reflect that the association is derived from the language metamodel. The TDLang model does not provide any function on its own, but it is the type target for the association from the Type Descriptor metamodel to the language metamodels.

FIG. 9 illustrates the structure of the TDLang Metamodel, with the TDLangClassifier 501, the TDLangComposedType 503 and the TDLangElement 505.

With the TDLang base classes, the Type Descriptor metamodel can be used as a recipe for runtime data transformation (or marshaling) with the language-specific metamodel for overall data structures and field names, without duplicating the aggregation associations present in the language model.

4. b. Type Descriptor Metamodel

This metamodel is a MOF Class instance at the M2 level. FIG. 10 shows the relationships within the type descriptor Metamodel, including the PlatformCompilerType 601, the InstanceTDBase 603, the ArrayTD 605, the AggregateInstanceTD 607, the Simple InstanceTD 609, and the InstanceType 611. The InstanceType 611 comprises definitions of the StringTD 613, the AddressTD 615, the NumberTD 617, and the FloatTD 619. FIG. 11 illustrates a higher level view of the TDLanguageElement and the PlatformCompilerType 601. FIG. 12 illustrates enumerations of signCoding 801, lengthEncoding 803, floatType 805, accessor 807, packedDecimalSign 809, and bitModePad 811.

4. c. Type Descriptor and Language models

The Type Descriptor model is attached to the CAM Language model by a navigable association between TDLangElement and InstanceTDBase. TDLangElement is the base language model type used to represent a declared data item, i.e., an instance of a type. InstanceTDBase is the base Type Descriptor model type used to represent the implementation-specific instance of this same declared data item. InstanceTDBase is abstract; only one of its subtypes may be instantiated.

It is possible that a data item declared in a programming language may have different implementations. These differences are induced by hardware platform, system platform, and compiler differences. This possibility is modeled by the PlatformCompilerType model type. The association between TDLangElement and PlatformCompilerType is many to one, and the association between PlatformCompilerType and InstanceTDBase is one to one. To navigate from the language model, it is necessary to know what PlatformCompilerType is to be assumed. It is possible that an implementation, upon importing a model instance, will wish to remove from the model the PlatformCompilerType instances that are not of interest.

The association between TDLangElement and InstanceTDBase is modeled in this manner to allow for extending the model to include an association between PlatformCompilerType and a new type that more fully describes the hardware platform, the system platform, and the compiler.

Data element instances may be defined as repeating groups or arrays. This is modeled as a one to many association between InstanceTDBase and the ArrayTD model type. There would be one ArrayTD instance in this association for each dimension, subscript, or independent index of the data element. These instances hold information about the bounds and accessing computations.

The association is ordered in the same order as the corresponding association in the language model, and reflects the syntactic ordering of the indices as defined by the programming language. The rationale for this choice is the resulting equivalence of navigation and processing algorithms between the language model and the Type Descriptor model. Another choice, perhaps more advantageous to marshaling engines, would be to have the ordering of the indices from the smallest stride to the largest. This allows a marshaling engine to process the array in its natural storage order, assuming it is laid out in the usual contiguous fashion. A marshaling engine can compute this order by re-sorting the association targets according to the stride formulas if desired.

Array information may be a complex property of the data element or of its type, and various languages and programming practices seem to fall on either side. The typedef facility of C and C++ allows the definition of some array types from typedefs, but only where the array definitions are applied to the topmost elements of typedef aggregates. For example, consider the following typedef:

```
typedef struct {
    int A;
    struct {
        int C;
        char D;
        struct {
            int F;
            int G;
        } E;
    } B;
} X;
```

This typedef can be used to create a new typedef for a fixed size array, e.g.

```
typedef X Q[10];
```

But it is not possible to create a new typedef from X that makes any of the subcomponents of X, e.g., D or E, into an array. This example and many others point out the unclear status of array definitions in typed languages.

An InstanceTDBase type has two concrete subtypes, SimpleInstanceTD and AggregateInstanceTD. SimpleInstanceTD models data elements without subcomponents, while AggregateInstanceTD models data elements with subcomponents. To find the subcomponents of an AggregateInstanceTD, one must navigate back to the corresponding data element declaration in the CAM language model. There, the association between an aggregate type and its subcomponents may be navigated, leading to a set of subcomponent data elements, each of which has one or more corresponding instances in the Type Descriptor model. This introduces some model navigation complexity, but avoids duplicating the aggregation hierarchy in both the language and the Type Descriptor models. The additional processing complexity of traversal is not great, and considerable simplification is obtained in algorithms that would modify the model to add, delete or rearrange subcomponents in an aggregation.

A SimpleInstanceTD model type is also associated one to one with a BaseTD model type. The BaseTD model type is specialized to hold implementation information that is common for all data elements of the same language type. The information that describes a 32-bit signed binary integer on a specific hardware/software platform is thus instantiated only once in a given model instantiation, no matter how many data elements may be declared with this type.

One may contemplate an association between TDLang-Classifier and BaseTD matching the association between TDLangElement and InstanceTDBase. However, this is problematic in that constructions that the language regards as simple types (e.g., strings) may not map directly to simple hardware/software types. Rather than introduce more mechanisms into the Type Descriptor model to describe string implementations, a specialization of BaseTD is utilized which describes the common string implementations. Various attributes in the TypeDescriptor model are suffixed with the string "formula." These attributes contain information that may in some cases be impossible to compute without access to data created only at run-time. An example is the current upper bound of a variable-sized array or the offset to an element that follows another element whose size is only known at run-time. Such information could be included as values in a model instance, but this would require a model instance for each run-time instance, and would mean that the model could only be constructed at run-time, requiring the model definition to include factories and other apparatus to create model instances at run-time. A model that can be constructed from platform and compiler knowledge is much more useful, and the formulas provide a way to define concrete values when the run-time information is available. These formulas may be interpreted by marshaling engines, or they may be used to generate marshaling code, which is loaded and executed by the marshaling engine on demand.

6. Application-Domain Interface Metamodel IMS Transaction Message Metamodel

The IMS Transaction Message metamodel is shown in FIG. 9. It includes three types of IMS transaction messages:
IMS OTMA messages with prefix
IMS messages without prefix—A default OTMA prefix can be built by IMS
IMS basic messages to be sent to application programs directly 6. a. i. IMS OTMA Prefix An IMS OTMA message prefix is composed of the following components, FIG. 10 illustrates the OTMA prefix metadata model. FIG. 11 illustrates the OTMA prefix in control data defined data types. FIG. 12 illustrates the OTMA prefix in state defined data types. FIG. 13 illustrates the OTMA prefix in security defined types. FIG. 14 illustrates the IMS Messages primitives in the IMS Metamodel.

Control data: This section includes the transaction-pipe name, message type, sequence numbers, flags and indicators.

State data: This section includes a destination override, map name, synchronization level, commit mode, tokens and server state.

Security data: This section includes the user ID, user token, and security flags.

User data: This section includes any special information needed by the client.

The OTMA prefix metamodel is characterized as follows.
1) OTMA Prefix—Control Data Defined Types
2) OTMA Prefix—State Data Defined Types
3) OTMA Prefix—Security Data Defined Types
6. a. ii. IMS Messages Primitive Types
6. a. i. a). IMSTransactionMessage Metamodel Specification
IMSTransactionMessage metamodel includes the following IMS messages scenarios:
IMS OTMA messages with the prefix
IMS OTMA messages without the prefix
IMS basic messages to be sent to the application program directly.

Private Attributes:
OTMAPrefixFormat: OTMAPrefixFormats=one
StandardFieldsFlag: boolean
OTMAPrefixFormats
Private Attributes:
one:
two:
StandardFields StandardFields (consisting LL, ZZ and transaction code) are not included in the following scenarios:
Sending XML documents directly to the IMS transaction application programs
ACK or NAK messages to IMS applications Private Attributes:
Length: TwoByteField
Also known as LL.
ReservedField: TwoByteField
Also known as ZZ.
TransactionCode: VariableLengthField
The Transaction Code field can be from 1 to 8 bytes in length.
TransactionCode appears with first segment of input messages only.
TransactionCode comes after LLZZ.
OTMAPrefix
OTMAPrefix An IMS OTMA prefix can appear either before all message segments, or only before the first segment of the message. However, the OTMA prefix is optional. If it is not specified, the IMS gateway will build a default one for the request.

Control Data.

Control data is message-control information. It includes the transaction-pipe name, message type, sequence numbers, flags and indicators.

Private Attributes:
ArchitectureLevel: OneByteField

Specifies the OTMA architecture level. The client specifies an architecture level, and the server indicates in the response message which architecture level it is using. The architecture levels used by a client and a server must match.

With IMS Version 6, the only valid value is X'01'.
Mandatory for all messages.
MessageType: TMessageType Specifies the message type. Every OTMA message must specify a value for the message type. The values are not mutually exclusive. For example, when the server sends an ACK message to a client-submitted transaction, both the transaction and response flags are set.

ResponseFlag: OneByteField

Specifies either that the message is a response message or that a response is requested.

Acknowledgements to transactions include attributes (for that transaction) in the application-data section of the message prefix only if the transaction specifies Extended Response Requested.

CommitConfirmationFlag: TCommitConfirmationFlag

Specifies the success of a commit request. Sent by the server to the client in a commit-confirmation message.

These messages are only applicable for send-then-commit transactions, and are not affected by the synchronization-level flag in the state-data section of the message prefix.

CommandType: TCommandType

Specifies the OTMA protocol command type.

IMS MTO commands are specified in the application-data section of the message.

ProcessingFlag: TProcessingFlag

Specifies options by which a client or a server can control message processing.

TpipeName: EightByteField

Specifies the transaction-pipe name. For IMS, this name is used to override the LTERM name on the I/O PCB. This field is applicable for all transaction, data, and commit-confirmation message types. It is also applicable for certain response and command message types.

ChainFlag: TChainFlag

Specifies how many segments are in the message. This flag is applicable to transaction and data message types, and it is mandatory for multi-segment messages.

PrefixFlag: TPrefixFlag

Specifies the sections of the message prefix that are attached to the OTMA message. Every message must have the message-control information section, but any combination of other sections can be sent with an OTMA message.

SendSequenceNumber: FourByteField

Specifies the sequence number for a transaction pipe. This sequence number is updated by the client and server when sending message or transactions.

Recommendation: Increment the number separately for each transaction pipe.

This number can also be used to match an ACK or NAK message with the specific message being acknowledged.

SenseCode: TwoByteField

Specifies the sense code that accompanies a NAK message.

ReasonCode: TwoByteField

Specifies the reason code that accompanies a NAK message. This code can further qualify a sense code.

RecoverableSequenceNumber: FourByteField

Specifies the recoverable sequence number for a transaction pipe.

Incremented on every send orf a recoverable message using a synchronized transaction pipe. Both the client and the server increment their recoverable send-sequence numbers and maintain them separately from the send-sequence number.

SegmentSequenceNumber: TwoByteField

Specifies the sequence number for a segment of a multi-segment message.

This number must be updated for each segment, because messages are not necessarily delivered sequentially by XCF.

This number must have a value of 0 (zero) if the message has only one segment.

Reserved: TwoByteField
DefinedTypes
TMessageType

Private Attributes:

Data: String

Data (value X'80')

Specifies server output data sent to the client. If the client specifies synchronization level Confirm in the state-data section of the message prefix, the server also sets Response Requested for the response flag. If the client does not specify a synchronization level, the server uses the default, Confirm.

Transaction: String

Transaction (value X'40')

Specifies client input data to the server.

Response: String

Response (value X'20')

Specifies that the message is a response message, and is only set if the message for which this message is the response specified Response Requested for the response flag.

If this flag is set, the response flag specifies either ACK or NAK. The send-sequence numbers must match for the original data message and the response message. Chained transaction input messages to the server must always request a response before the next transaction (for a particular transaction pipe) is sent.

Command: String

Command (value X'10')$Specifies an OTMA protocol command. OTMA commands must always specify Response Requested for the Response flag.

CommitConfirmation: String

CommitConfirmation (value X'08')—Specifies that commit is complete.

This is sent by the server when a sync point has completed, and is only applicable for send-then-commit transactions. The commit-confirmation flag is also set.

TResponseFlag

Private Attributes:

ACK: String

ACK (value X'80') Specifies a positive acknowledgement.

NAK: String

NAK (value X'40') Specifies a negative acknowledgement.

See the sense code field for more information on the reason for the NAK.

ResponseRequested: String

Response Requested (value X'20') Specifies that a response is requested for this message. This can be set for message types of Data, Transaction, or Command.

When sending send-then-commit IMS command output, IMS does not request an ACK regardless of the synchronization level.

ExtendedResponseRequested: String

Extended Response Requested (value X'10')—Specifies that an extended response is requested for this message. Can be set by a client only for transactions (or for transactions that specify an IMS command instead of a transaction code). If this flag is set for a transaction, IMS returns the architected attributes for that transaction in the application-data section of the ACK message. If this flag is set for a command, IMS returns the architected attributes in the application-data section of the ACK message.

This flag can be set for the IMS commands/DISPLAY TRANSACTION and/DISPLAY TRANSACTION ALL.

TCommitConfirmationFlag

Private Attributes:

Committed: String

Committed (value X'80')—Specifies that the server committed successfully.

Aborted: String

Aborted (value X'40')—Specifies that the server aborted the commit.

TCommandType

Private Attributes:

ClientBid: String

Client-Bid (value X'04')—Specifies the first message a client sends to the OTMA server. This command must also set the response-requested flag and the security flag in the message-control information section of the message prefix. The appropriate stat-data fields (for example, Member Name) must also be set. The security-data prefix must specify a Utoken field so the OTMA server can validate the client's authority to act as an OTMA client. Because the server can respond to the client-bid request, this message should nto be sent until the client is ready to start accepting data messages.

ServerAvailable: String

Server Available (value X'08')—Specifies the first message the server sends to a client. It is sent when the server has connected to the XCF group before the client has connected. The client replies to the server Available message with a client-bid request. The appropriate state data fields (for example, Member Name) must also be set. If the client connects first, it is notified by XCF when the server connects, and begins processing with a client-bid request.

CBresynch: String

CBresynch (value X'0C')—Specifies a client-bid message with a request by the client for resynchronization. This command is optional and causes the server to send an SRVresynch message to the client. The CBresynch command is the first message that a client sends to the OTMA server when it attempts to resynchronize with IMS and existing synchronized Tpipes exist for the client. Other than the CBresynch message indicator in the message prefix, the information required for the message prefix should be identical to the client-bid command. If IMS receives a client-bid request for them client and IMS is aware of existing synchronized Tpipes, IMS issues informational message DFS2394I to the MTO. IMS resets the recoverable send—or receive—sequence numbers to 0 (zero) for all the synchronized Tpipes.

SuspendProcessingForAllTpipes: String

Suspend Processing for All Tpipes (value X'14')—Specifies that the server is suspending all message activity with the client. All subsequent data input receives a NAK message from the server. Similarly, the client should send a NAK message for any subsequent server messages. If a client wishes to suspend processing for a particular transaction pipe, it must submit a/STOP TPIPE command as an OTMA message.

ResumeProcessingForAllTpipes: String

Resume processing for All Tpipes (value X'18')—Specifies that the server is resuming message activity with the client. If a client wishes to resume processing for a particular transaction pipe that has been stopped, it must submit a/START TPIPE command as an OTMA message.

SuspendInputForTpipe: String

Suspend Input for Tpipe (value X'1C')—Specifies that the server is overloaded and is temporarily suspending input for the transaction pipe. All subsequent client input receive NAK messages for the transation pipe specified in the message-control information section of the message prefix. A response is not requested for this command. This architected command is also sent by IMS when the master terminal operator enters a/STOP TPIPE command.

ResumeInputForTpipe: String

Resume Input for Tpipe (value X'20') Specifies that the server is ready to resume client input following an earlier Suspend Input for Tpipe command. A response is not requested for this command. This command is also sent by IMS when the IMS master terminal operator issues a/START TPIPE command.

SRVresynch: String

SRVresynch (value X'2C')—Specifies the server's response to a client's CBresynch command. This command specifies the states of synchronized transaction pipes within the server (the send- and receive-sequence numbers). This command is sent as a single message (with single or multiple segments), and an ACK is requested.

REQresynch: String

REQresynch (value X'30')—Specifies the send-sequence number and the receive sequence for a particular Tpipe. REQresynch is send from IMS to a client.

REPresynch: String

REPresynch (value X'34')—Specifies the client's desired state information for a Tpipe. A client sends the REPresynch command to IMS in response to the REQresynch command received from IMS.

TBresynch: String

TBresynch (value X'38')—Specifies that the client is ready to receive the REQresynch command from IMS.

TProcessingFlag

Private Attributes:

SynchronizedTpipe: String

Synchronized Tpipe (value X'40')—Specifies that the transaction pipe is to be synchronized. Allows the client to resynchronize a transaction pipe if there is a failure. Only valid for commit-then-send transactions. This flag causes input and output sequence numbers to be maintained for the transaction pipe. All transactions routed through the transaction pipe must specify this flag consistently (either on or off).

1 AsynchronousOutput: String

Asynchronous output (value X'20')—Specifies that the server is sending unsolicited queued output to the client. This can occur when IMS inserts a message to an alternate PCB. Certain IMS commands, when submitted as commit-then-send, can cause IMS to send the output to a client with this flag set. In this case, the OTMA prefixes contain no identifying information that the client can use to correlate the output to the originating command message. These command output data messages simply identify the transaction-pipe name. IMS can also send some unsolicited error messages with only the transaction-pipe name.

ErrorMessageFollows: String

Error Message Follows (value X'10')—Specifies that an error message follows this message. This flag is set for NAK messages from the server.

An additional error message is then sent to the client. The asynchronous-output flag is not set in the error data message, because the output is not generated by an IMS application.

TChainFlag

Private Attributes:

FirstInChain: String

First-In-Chain (value X'80')—Specifies the first segment in a chain of segments which comprise a multi-segment message. Subsequent segments of the message only need the message-control information section of the message prefix. Other applicable prefix segments (for example, those specified by the client on the transaction message) are sent only with the first segment (with the first-in-chain flag set). If the OTMA message has only one segment, the last-in-chain flag should also be set.

MiddleInChain: String

Middle-In-Chain (value X'40')—Specifies a segment that is neither first nor last in a chain of segments that comprise a multi-segment message. These segments only need the message-control information section of the message prefix.

Restriction: Because the client and server tokens are in the state-data section of the message prefix, they cannot be used to correlate and combine segmented messages. The transaction-pipe name and send-sequence numbers can be used for this purpose; they are in the message-control information section of the message prefix for each segment.

LastInChain: String

Last-In-Chain (value X'20')—Specifies the last segment of a multi-segment message.

DiscardChain: String

Discard Chain (value X'10')—Specifies that the entire chain of a multi-segment message is to be discarded. The last-in-chain flag must also be set.

TPrefixFlag

Private Attributes:

StateData: String

State Data (value X'80')—Specifies that the message includes the state-data section of the message prefix.

SecurityData: String

Security (value X'40')—Specifies that the message includes the security-data section of the message prefix.

UserData: String

User Data (value X'20')—Specifies that the message includes the user-data section of the message prefix.

ApplicationData: String

Application Data (value X'10')—Specifies that the message includes the application-data section of the message prefix.

StateData

StateData

This includes a destination override, map name, synchronization level, commit mode, tokens and server state. Note that this is state data for a transaction. OTMA also supports state data headers for the following: Server Available Command, Client Bid Command, SRVresynch Command, REQresynch Command, REPresynch Command. However, these commands would never be generated by a client device, and so command messages would never come into the IMS Connect interface, and so we do not need to model them.

Private Attributes:

Length: TwoByteField

ServerState: TServerState Specifies the mode in which the transaction is running.

SynchronizationFlag: TSynchronizationFlag—Specifies the commit mode of the transaction. This flag controls and synchronizes the flow of data between the client and server.

SynchronizationLevel: TSynchronizationLevel—Specifies the transaction synchronization level, the way in which the client and server transaction program (for example, IMS application program) interacts with program output messages. The default is Confirm. IMS always requests a response when sending commit-then-send output to a client.

Reserved: OneByteField

MapName: EightByteField—Specifies the formatting map used by the server to map output data streams (for example, 3270 data streams). Although OTMA does not provide MFS support, you can use the map name to define the output data stream. The name is an 8-byte MOD name that is placed in the I/O PCB. IMS replaces this field in the prefix with the map name in the I/O PCB when the message is inserted.

The map name is optional.

ServerToken: SixteenByteField—Specifies the server name. The Server Token must be returned by the client to the server on response messages (ACKs or NAKs). For conversational transactions, the Server Token must also be returned by the client on subsequent conversational input.

CorrelatorToken: SixteenByteField—Specifies a client token to correlate input with output. This token is optional and is not used by the server.

Recommendation: Clients should use this token to help manage their transactions.

ContextID: SixteenByteField

Specifies the RRS/MVS token that is used with SYNCLVL=02 and protected conversations.

DestinationOverride: EightByteField—Specifies an LTERM name used to override the LTERM name in the IMS application program's I/O PCB. This override is used if the client does not want to override the LTERM name in the I/O PCB with the transaction-pipe name. This optional override is not used if it begins with a blank.

ServerUserDataLength: TwoByteField—Specifies the length of the server user data, if any. The maximum length of the server use data is 256 bytes.

ServerUserData: VariableLengthField—Specifies any data needed by the server. If included in a transaction message by the client, it is returned by the server in the output data messages.

DefinedTypes

TServerState

Private Attributes:

ConversationalState: String

Conversational State (value X'80')—Specifies a conversational mode transaction. The server sets this state when processing a conversational-mode transaction.

This state is also set by the client when sending subsequent IMS conversational data messages to IMS.

ResponseMode: String

Response Mode (value X'40')—Specifies a response-mode transaction. Set by the server when processing a response-mode transaction. This state has little significance for an OTMA server, because OTMA does not use sessions or terminals.

TSynchronizationFlag

Private Attributes:

CommitThenSend: String

Commit-then-Send (value X'40')—Specifies a commit-then-send transaction. The server commits output before sending it; for example, IMS inserts the output to the IMS message queue.

SendThenCommit: String

Send-then-Commit (value X'20')—Specifies a send-then-commit transaction. The server sends output to the client before committing it.

TSynchronizationLevel

Private Attributes:

None: String

None (value X'00')—Specifies that no synchronization is requested. The server application program does not request an ACK message when it sends output to a client. None is only valid for send-then-commit transactions.

Confirm: String

Confirm (value X'01')—Specifies that synchronization is requested. The server sends transaction output with the response flag set to Response Requested in the message-control information section of the message prefix. Confirm can be used for either commit-then-send or send-then-commit transactions.

SYNCPT: String

SYNCPT (value X'02')—Specifies that the programs participate in coordinated commit processing on resources updated during the conversion under the RRS/MVS recovery platform. A conversation with this level is also called a protected conversation.

SecurityData

SecurityData

This includes the user ID, user token, and security flags.

The security-data section is mandatory for every transaction, and can be present for OTMA command messages.

Private Attributes:

Length: TwoByteField—Specifies the length of the security data section of the message prefix, including the length field.

SecurityFlag: TSecurityFlag—Specifies the type of security checking to be performed. It is assumed that the user ID and password are already verified.

LengthOfSecurityFields: OneByteField—Specifies the length of the security data fields: User ID, Profile, and Utoken. These three fields can appear in any order, or they can be omitted. Each has the following structure: Length field, then Field type, then Data field. The actual length of the User ID or Profile should not be less than the value specified for the length of each field. Length can be 0.

tokenLength: OneByteField

Specifies the length of the user token.

Length does not include length field itself.

UtokenType: OneByteField—Specifies that this field contains a user token. (Value X'00')

Utoken: VariableLengthField—Specifies the user token. The user ID and profile are used to create the user token. The user token is passed along to the IMS dependent region. If the client has already called FACF, it should pass the Utoken with field type X'00'so that RACF is not called again.

Variable length, from 1 to 80 bytes.

UserIDLength: OneByteField—Specifies the length of the user ID.

Length does not include length field itself.

UserIDType: OneByteField. Specifies that this field contains a user ID. (Value X'02').

UserID: VariableLengthField—Specifies the actual user ID.

Variable length, from 1 to 10 bytes.

ProfileLength: OneByteField. Specifies the length of the profile. Length does not include length field itself.

ProfileType: OneByteField Specifies that this field contains a profile. (Value X'03').

Profile: VariableLengthField. Specifies the system authorization facility (SAF) profile. For RACF, this is the group name.

Variable length, from 1 to 10 bytes.

DefinedTypes

TSecurityFlag

Private Attributes:

NoSecurity: String

No Security (value X'N')—Specifies that no security checking is to be done.

Check: String

Check (value X'C')—Specifies that transaction and command security checking is to be performed.

Full: String

Full (value X'F')

Specifies that transaction, command, and MPP region security checking is to be performed.

UserData

UserData

This includes any special information needed by the client.

The user-data section is variable length and follows the security-data section of the message prefix. It can contain any data.

Private Attributes:

Length: TwoByteField

Specifies the length of the user-data section of the message prefix, including the length field. The maximum length of the user data is 1024 bytes.

UserData: VariableLengthField

Specifies the optional user data. This data is managed by the client, and can be created and updated using the DFSYDRU0 exit routine. The server returns this section unchanged to the client as the first segment of any output messages.

Primitives

OneByteField

TwoByteField

FourByteField
EightByteField
SixteenByteField
SixByteField
VariableLengthField
ApplicationData
ApplicationData
    The application data class contains all the message data except for LL, ZZ, and the transaction code.
    Note: this model does not capture the notion of message segments. When using this model you have to bear in mind whether the system you are using has any limitations such as a maximum segment size. IMS connectors (via OTMA or SNA) must support the capability of breaking the "application data" into IMS message segments. For instance, if you are sending this XML message directly to the IMS message queue and if the message queue has a 32 k limit, then you have to take your XML message and break it up into 32 k chunks. The application on IMS will then have to gather up the 32 k chunks one by one. IMS new applications that receive XML documents directly, must be capable of receiving XML documents in multiple segments. For ACK or NAK messages, there is no application data included in the message.
    Field
    Each data field, defined in a copybook for the application data, will be associated with type descriptor for data types.

While the invention has been described with respect to certain preferred embodiments and exemplifications, it is not intended to limit the scope of the invention thereby, but solely by the claims appended hereto.

We claim:

1. A method of processing an application request on an end user application and an application server including a transaction manager comprising the steps of:
    a) initiating the application request on the end user application in a first language with a first application program;
    b) transmitting the application request to the application server and converting the application request from the first language of the first end user application to a second language in a form for the transaction manager running on the application server;
    c) processing said application request on the application server;
    d) transmitting a response to the application request from the application server to the end user application, and converting the response to the application request from the second language conforming to the transaction manager running on the application server to the first language of the first end user application; and
    e) wherein the end user application and the application server have at least one connector therebetween, and the steps of (i) converting the application request from the first language of the first end user application as a source language to the second language running on the application server as a target language, and (ii) converting the response to the application request from the second language running on the application server as a source language to the first language of the first end user application as a target language, each comprise the steps of:
        1) invoking connector metamodels of respective source and target languages;
        2) populating the connector metamodels with metamodel data of each of the respective source and target languages, and metamodel data of the target transaction manager; and
        3) converting the source language to the target language.

2. The method of claim 1 wherein the end user application is a web browser.

3. The method of claim 2 wherein the end user application is connected to the application server through a web server, and the web server comprises a connector.

4. The method of claim 1 wherein the metamodel data comprises invocation metamodel data, application domain interface metamodel data, transaction message metamodel data, and type descriptor metamodel data.

5. The method of claim 1 wherein the metamodel data of the transaction manager includes control data, state data, and user data.

6. A transaction processing system comprising a client, a server, and at least one connector therebetween,
    a) the client having an end user application, and being controlled and configured to initiate an application request with the server in a first language with a first application program and to transmit the application request to the server;
    b) the connector being configured and controlled to receive the application request from the client, convert the application request from the first language of the first end user application running on the client to a second language in a form for a transaction manager running on the server;
    c) the server being configured and controlled to receive the converted application request from the connector and process the application request in the second language with a second application program residing on the server, and to thereafter transmit a response to the application request through the connector back to the first application program on the client;
    d) the connector being configured and controlled to receive the response to the application request from the server, to convert the response to the application request from the second language running on the server to the first language of the first application program running on the client; and
    e) wherein the connector between the client and the server is configured and controlled to (i) convert the application request from the first language of the client application on the client as a source language to the second language running on the server as a target language, and (ii) convert the response to the application request from the second language running on the server as a source language to the first language of the client application running on the client as a target language, each by a method comprising the steps of:
        1) retrieving connector metamodels of respective source and target languages from a metamodel data repository, including transaction manager metadata corresponding to the transaction manager;
        2) populating the connector metamodels with metamodel data from the metamodel data repository for each of the respective source and target languages; and
        3) invoking the retrieved, populated connector metamodels and converting the source language to the target language.

7. The system of claim 6 wherein the end user application is a web browser.

8. The system of claim 7 wherein the end user application is connected to the server through a web server, and the web server comprises a connector.

9. The system of claim 6 wherein the transaction manager metadata includes control data, state data, and user data.

10. A transaction processing system configured and controlled to interact with a client application, and comprising a server, and at least one connector between the server and the client application, wherein:
   a) the client having an end user application, and being configured and controlled to initiate an application request with the server in a first language with a first application program and to transmit the application request to the server;
   b) the connector being configured and controlled to receive the application request from the client, convert the application request from the first language of the first end user application running on the client to a second language in a form for a transaction manager running on the server;
   c) the server being configured and controlled to receive the converted application request from the connector and process the application request in the second language with a second application program and the transaction manager residing on the server, and to thereafter transmit a response to the application request through the connector back to the first application program on the client;
   d) the connector being configured and controlled to receive the response to the application request from the server, to convert the response to the application request from the second language running on the server to the first language of the first application program running on the client; and
   e) wherein the connector between the client and the server is configured and controlled to (i) convert the application request from the first language of the client application on the client as a source language to the second language running on the application server as a target language, and (ii) convert the response to the application request from the second language running on the application server as a source language to the first language of the client application running on the client as a target language, each by a method comprising the steps of:
      1) retrieving connector metamodel data of respective source and target languages from a metamodel data repository;
      2) populating the connector metamodels with metamodel data of each of the respective source and target languages, and the transaction manager, from the metamodel data repository; and invoking the retrieved, populated connector metamodels; and
      3) converting the source language to the target language.

11. The system of claim 10 wherein the end user application is a web browser.

12. The system of claim 11 wherein the end user application is connected to the server through a web server, and the web server comprises a connector.

13. The system of claim 10 wherein the metamodel data of the transaction manager includes control data, state data, and user data.

14. A program product comprising a computer-readable storage medium having invocation metamodel data, application domain interface metamodel data, language metamodel data, and transaction manager metamodel data, said transaction manager metamodel data including control data, state data, and user data;
   computer instructions for building a metamodel data repository of source and target language metamodel data; and
   computer instructions to build a connector for:
      1) retrieving connector metamodel of respective source and target languages from a metamodel data repository;
      2) populating the connector metamodel with metamodel data from the metamodel data repository for each of the respective source and target languages; and
      3) invoking the retrieved, populated connector metamodel and converting the source language to the target language.

15. The program product of claim 14 wherein the metamodel data in the repository comprises invocation metamodel data, application domain interface metamodel data, transaction manager metamodel data, and type descriptor metamodel data.

* * * * *